(12) United States Patent
Fujita et al.

(10) Patent No.: US 8,592,020 B2
(45) Date of Patent: Nov. 26, 2013

(54) STRUCTURAL MEMBER AND SEAT STRUCTURE FOR TRANSPORT MACHINE

(75) Inventors: Etsunori Fujita, Hiroshima (JP); Yasuhide Takata, Hiroshima (JP); Yumi Ogura, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 423 days.

(21) Appl. No.: 12/920,833

(22) PCT Filed: Jan. 28, 2009

(86) PCT No.: PCT/JP2009/051367
§ 371 (c)(1),
(2), (4) Date: Nov. 16, 2010

(87) PCT Pub. No.: WO2009/110264
PCT Pub. Date: Sep. 11, 2009

(65) Prior Publication Data
US 2011/0057498 A1    Mar. 10, 2011

(30) Foreign Application Priority Data
Mar. 3, 2008 (JP) ................................. 2008-052742

(51) Int. Cl.
*B60N 2/68* (2006.01)
*B32B 27/12* (2006.01)

(52) U.S. Cl.
USPC ............................ 428/57; 428/53; 428/214

(58) Field of Classification Search
USPC .............................................. 428/57, 53, 214
See application file for complete search history.

(56) References Cited

U.S. PATENT DOCUMENTS

| 4,812,355 A | * | 3/1989 | Yokoyama et al. ........... 428/215 |
| 2007/0144111 A1 | | 6/2007 | Kennedy |

FOREIGN PATENT DOCUMENTS

| JP | 06-33372 | 2/1994 |
| JP | 9 86445 | 3/1997 |
| JP | 2001 99597 | 4/2001 |
| JP | 2002 240658 | 8/2002 |
| JP | 2007 512977 | 5/2007 |
| JP | 2007-287481 | 11/2007 |

OTHER PUBLICATIONS

Notification of Reasons for Refusal issued Jul. 26, 2013 in Japanese Patent Application No. JP 2008-052742 w/English translation.

* cited by examiner

*Primary Examiner* — Brent O'Hern
(74) *Attorney, Agent, or Firm* — Oblon, Spivak, McClelland, Maier & Neustadt, L.L.P.

(57) ABSTRACT

To achieve further weight reduction and thinning of a seat structure. A configuration in which a side frame cover 212 composed of a laminated body 1 provided with a planar member made of cloth and planar members made of synthetic resin laminated on both sides of the planar member made of cloth via adhesive agent and formed in a predetermined shape is joined to a side frame base body 211 composed of a metal member is obtained. Therefore, the thickness of the metal member used can be reduced by an amount corresponding to a strength the laminated body compensates for, which results in achievement of further weight reduction from a conventional structural member composed of only metal members that are used at the same site. Further, when an impact force is applied, the impact force can be consumed as a force that causes delamination of the laminated body from the metal member at a portion where they are joined via the adhesive agent.

13 Claims, 14 Drawing Sheets

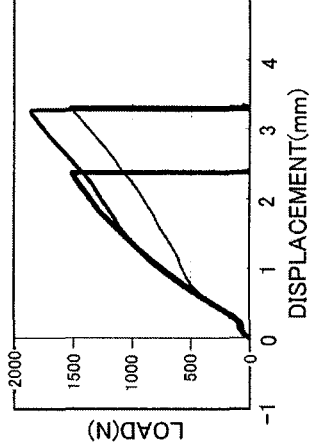
Fig. 11A  ROLL DIRECTION
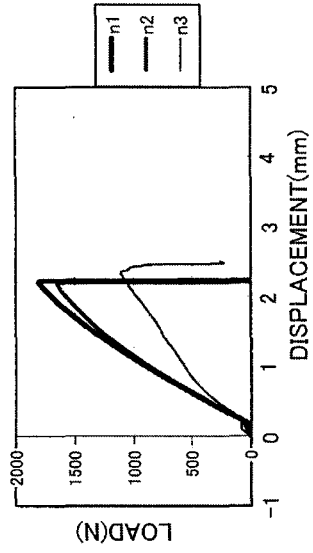
Fig. 11B  BIAS DIRECTION
Fig. 11C  WIDTHWISE DIRECTION

STRUCTURAL MEMBER AND SEAT STRUCTURE FOR TRANSPORT MACHINE

TECHNICAL FIELD

The present invention relates to a structural member using synthetic resin and a seat structure for a transport machine using the structural member as a frame member.

BACKGROUND ART

In a transport machine such as an automobile, in order to achieve weight reduction, the rate of usage of synthetic resin members has increased. For example, in Patent Document 1, a vehicle body structure where a synthetic resin member is positively used for a portion which does not substantially contribute as a strengthening member, and where the synthetic resin member is joined to a metal member with adhesive agent, is disclosed.
Patent Document 1: Japanese Patent Application Laid-open No. H09-86445

SUMMARY OF INVENTION

Technical Problem

Further reduction in weight of a structural member used in an automobile or the like is constantly pursued in view of improvement in fuel efficiency or the like, and, like Patent Document 1, synthetic resin members are increasingly used in place of as many metal members as possible. However, synthetic resin members are normally less strong than metal, and, also in Patent Document 1, the synthetic member is merely used in a portion which does not substantially contribute as a strengthening member. Therefore, for example, a ferrous metal material having a predetermined thickness is normally used for a frame member of a seat structure that functions as a strengthening member (a side frame, a slide rail of a slide adjuster, and the like). In order to increase the rate of usage of synthetic resin members, it is necessary to enhance a function to absorb an impact force generated by an impact or the like to cover a decrease in strength due to no use of metal members, especially, ferrous metal materials. Therefore, even if weight reduction is achieved by replacing some of the structural members with synthetic resin members, a new mechanism for absorbing an impact force might be required, which results in increase in the entire weight of a vehicle body. Therefore, when synthetic resin members are used in order to achieve weight reduction, it is desired that the synthetic resin members perform an impact absorbing action.

The present invention has been made in view of the above circumstance, and an object thereof is to provide a structural member that is suitable to be a strengthening member such as a frame member of a seat structure and that can contribute to further reduction in weight of the seat structure and therefore reduction in the entire weight of a vehicle body of a transport machine such as an automobile, and a seat structure for a transport machine.

Solution to Problem

In order to achieve the above object, a structural member of the present invention comprises, in combination: a laminated body provided with a planar member made of cloth and planar members made of synthetic resin laminated on both sides of the planar member made of cloth via adhesive agent and formed in a predetermined shape; and a metal member joined to at least a portion of the laminated body via adhesive agent.

It is preferred that the laminated body and the metal member are joined to each other, with the adhesive agent between the laminated body and the metal member impregnated into the planar member made of cloth configuring the laminated body.

Also, it is preferred that the laminated body and the metal member are joined to each other, with the adhesive agent between the laminated body and the metal member not impregnated into the planar member made of cloth of the laminated body but adhering only to the planar member made of synthetic resin facing the metal member.

Also, a structural member of the present invention comprises, in combination; a laminated body provided with a planar member made of cloth and planar members made of synthetic resin laminated on both sides of the planar member made of cloth via adhesive agent and formed in a predetermined shape and that is; and a metal member joined to at least a portion of the laminated body, wherein the laminated body and the metal member are joined to each other via an adhesive layer formed by impregnating adhesive agent into the planar member made of cloth.

It is preferred that the laminated body and the metal member are provided with protruded portions that are protruded toward each other when the laminated body and the metal member are made to face each other, one protruded portion being overlapped with any site of the other protruded portion, where the laminated body and the metal member are joined to each other.

Also, it is preferred that the adhesive layer formed by impregnating the adhesive agent into the planar member made of cloth is pulled out beyond a portion where the laminated body and the metal member are overlapped with each other, a pulled-out portion of the adhesive layer and an inner face of the metal member being joined to each other.

Also, it is preferred that the adhesive layer formed by impregnating the adhesive agent into the planar member made of cloth is pulled out beyond a portion where the laminated body and the metal member are overlapped with each other, and foamed synthetic resin is caused to intervene between the pulled-out portion of the adhesive layer and the inner face of the metal member to join the pulled-out portion of the adhesive layer and the inner face of the metal member to each other.

Also, it is preferred that, as compared with a homogeneous laminated body formed by laminating the planar members made of synthetic resin used for the laminated body, the laminated body is lower in both tensile stress and Izod impact strength with respect to at least one tensile direction of a longitudinal direction, a horizontal direction and an oblique direction due to a delaminating action that occurs among layers when an impact is applied to the laminated body, the lowering rates of tensile stress and Izod impact strength being equal to or less than 40%. The lowering rates are more preferably between 20% and 40%.

Also, it is preferred that, as compared with the homogeneous laminated body, the laminated body is lower in both tensile stress and Izod impact strength with respect to all tensile directions of a longitudinal direction, a horizontal direction and an oblique direction.

The planar member made of cloth is preferably a bi-axial woven fabric, a tri-axial woven fabric, a tetra-axial woven fabric or a three-dimensional solid knitted fabric, most preferably, the bi-axial woven fabric. The metal member can be formed from ferrous metal material or nonferrous metal material. Further, the structural member of the present invention is suitable for being used as a frame member in a seat structure for a transport machine.

The present invention also provides a seat structure for a transport machine wherein the structural member described above is used as a frame member.

Advantageous Effects of Invention

The present invention has a configuration in which a laminated body formed in a predetermined shape, which is provided with a planar member made of cloth and planar members made of synthetic resin laminated on both sides of the planar member made of cloth via adhesive agent, is joined to a metal member via adhesive agent. Therefore, the thickness of the metal member used can be reduced by an amount corresponding to a strength the laminated body compensates for, which results in achievement of further weight reduction from a conventional structural member formed of only metal members and used at the same site. Further, when an impact force is applied, the impact force can be consumed as a force that causes delamination of the laminated body from the metal member at a portion where they are joined via the adhesive agent. Furthermore, the laminated body of the present invention has a three-layered structure in which, between two planar members made of synthetic resin, a planar member made of cloth different in material from the planar members made of synthetic resin is laid. Therefore, higher rigidity than that of a laminated body formed of only planar members made of synthetic resin can be obtained, the effect of reduction in the thickness of a metal member is high, which contributes significantly to weight reduction, and, since a delaminating action due to an impact is caused in the laminated body itself, an impact absorbing action can be further enhanced.

BRIEF DESCRIPTION OF DRAWINGS

FIG. 11 is a graph showing tensile stresses of respective test pieces of Test Example 4;

DESCRIPTION OF EMBODIMENTS

Figure 1:
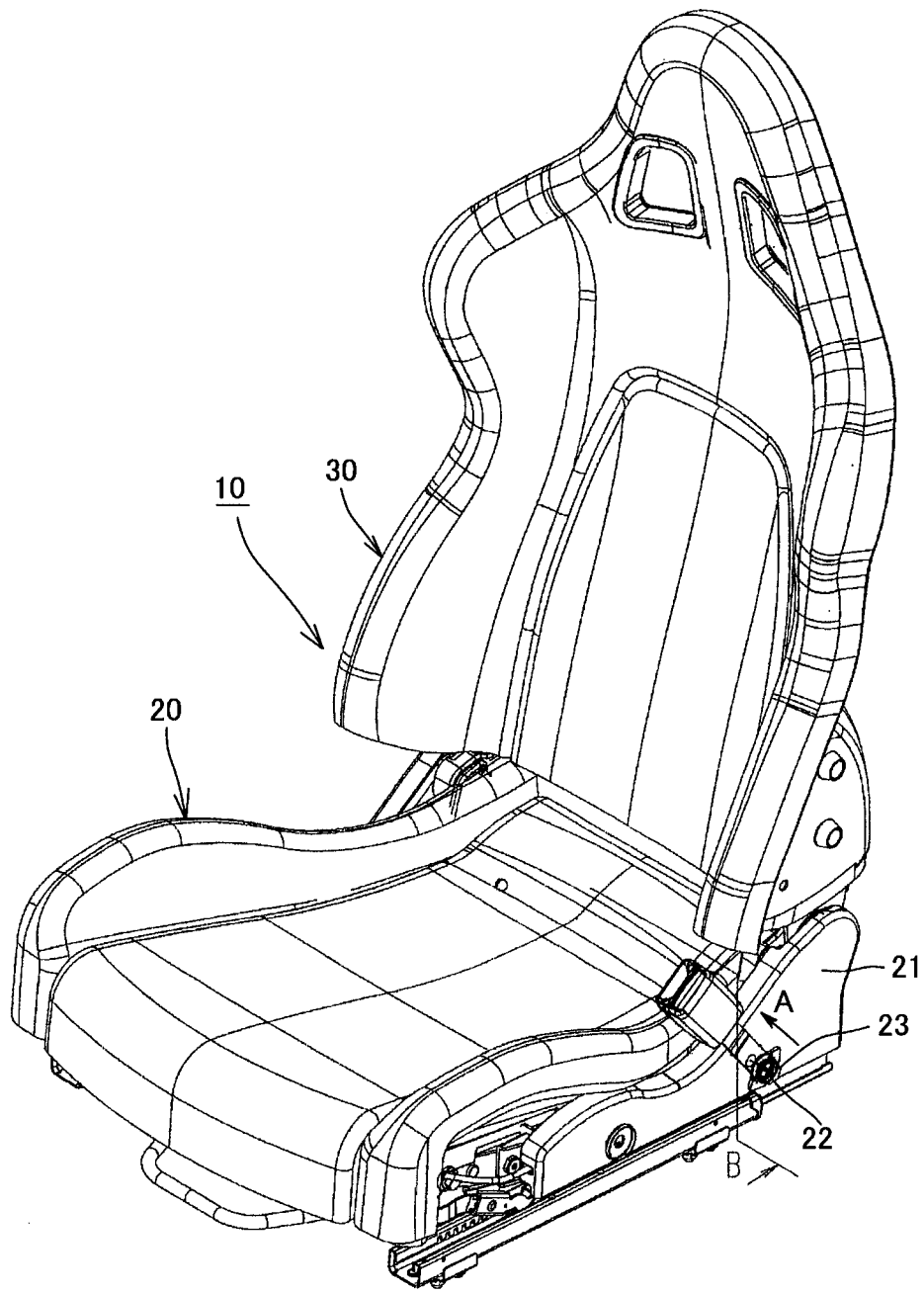
FIG. 1 is a view showing a seat structure for an automobile in which a structural member according to an embodiment of the present invention is used for a portion of a frame member.

Hereinafter, based upon an embodiment of the present invention shown in the drawings, explanation will be made in further detail. FIG. 1 is a view showing a seat structure 10 for an automobile in which a structural member of the present invention is adopted in a portion of a frame member. The seat structure 10 is of a bucket seat type, being provided with a seat cushion section 20 and seat back section 30, and the configuration of the structural member of the present invention is adopted as a side frame 21 of the seat cushion section 20.

Figure 2:
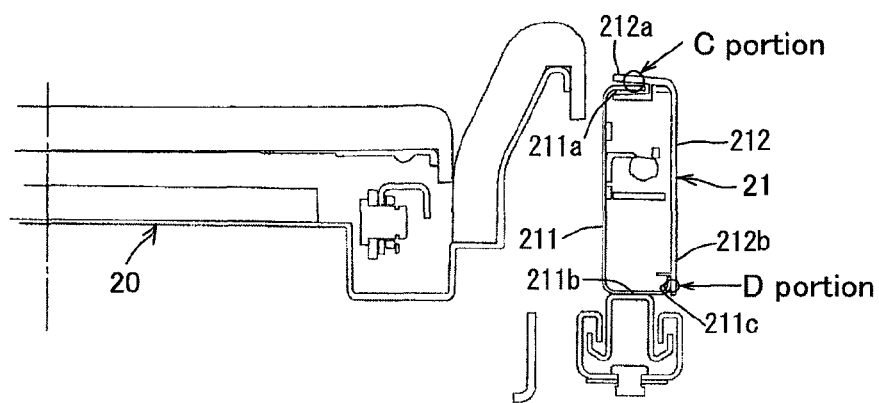
FIG. 2 is a sectional view of the seat structure taken along the line B in FIG. 1.

The side frame 21 comprises a side frame body 211 and a side frame cover 212, as shown in the sectional view of FIG. 2. The side frame base body 211 is composed of a metal member, and it is formed in an approximately U shape in section, and the side frame cover 212 is composed of a synthetic resin member, and it is formed in an approximately L shape in section. Incidentally, the metal member configuring the side frame base body 211 may be any metal member that is used as a frame member of the seat structure 10, so that, ferrous metal material such as iron, steel or stainless steel, or nonferrous metal material such as aluminum can be used. In this embodiment, however, such a coupling structure in which the side frame cover 212 composed of a synthetic resin member described later is joined via adhesive agent is adopted. In this embodiment, therefore, a thin plate made of ferrous metal material and having a thickness of about 0.8 to 1.0 mm works well for a site for which a member made of ferrous metal material and having a thickness of about 2.0 to 2.5 mm is conventionally required to be used from the aspect of strength. Further, even nonferrous metal material can achieve a predetermined strength as long as a thin plate having a thickness of about 0.8 to 2.0 mm is joined with a synthetic resin member described later. As a result, weight reduction can be achieved as compared with a conventional structural member.

Two short pieces 211*a* and 211*b* that are protruded portions of the side frame base body 211 having an approximately U shape in section and a short piece 212*a* that is a protruded portion of the side frame cover 212 are made to face each other such that they are protruded in opposite directions, one short piece 211*a* of the side frame base body 211 and the short piece 212*a* of the side frame cover 212 are made to overlap each other, and portions overlapping each other (a C portion in FIG. 2) are joined to each other via adhesive agent. Further, a distal end bending portion 211c of the other short piece 211b of the side frame base body 211 is made to abut on an inner face of a long piece 212b of the side frame cover 212, and portions overlapping each other (a D portion in FIG. 2) are joined to each other via adhesive agent. Incidentally, as the adhesive agent, thermosetting adhesive that is excellent in adhesiveness between metal and synthetic resin is preferable.

Figure 3:
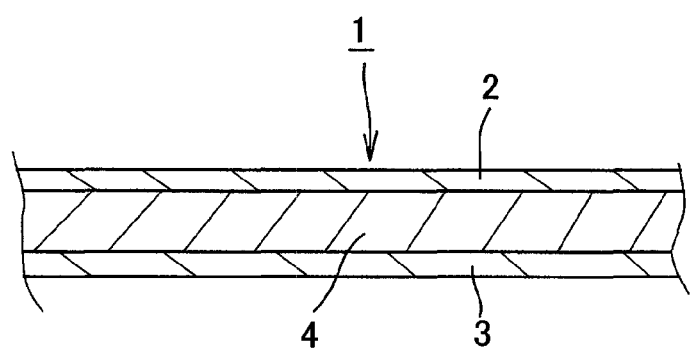
FIG. 3 is a diagram showing a sectional structure of a laminated body used in the structural member of the embodiment.

Here, more specifically, the synthetic resin member configuring the side frame cover 212 comprises a laminated body 1 in which a planar member 4 made of cloth is sandwiched between two planar members 2 and 3 made of synthetic resin, as shown in FIG. 3. Joining of one planar member 2 and the planar member 4 made of cloth, and joining of the planar member made of cloth 4 and the other planar member 3 are performed via adhesive agent, respectively.

For example, members made of thermosetting resin such as unsaturated polyester resin can be used as the planar members 2 and 3 made of synthetic resin. Further, fiber-reinforced plastic obtained by adding glass fibers or the like to thermosetting resin such as unsaturated polyester resin can be used. It is preferred that the planar member 4 made of cloth is selected from the group consisting of a bi-axial woven fabric, a tri-axial woven fabric, a tetra-axial woven fabric or a three-dimensional solid knitted fabric. Particularly, it is more preferable that the bi-axial woven fabric is used. The reason why the bi-axial woven fabric is preferred will be explained in detail in Test Examples described later. Incidentally, the three-dimensional solid knitted fabric is one knitted by reciprocating a connecting strand between a pair of ground knitted fabrics positioned at a predetermined interval and it is formed by using a double raschel machine or the like, and, in this embodiment, one having a thickness in arrange from 2 to 6 mm is preferably used and one having a thickness in a range from 2 to 4 mm is more preferably used. Further, the side frame cover 212 can be manufactured, for example, by molding the planar members 2 and 3 made of synthetic resin in predetermined shapes in advance and performing joining of one planar member 2 and the planar member 4 made of cloth and joining of the planar member 4 and the other planar member 3 through adhesive agent, respectively. Furthermore, the side frame cover 212 can also be manufactured by bonding fibers to both faces of the planar member 4 made of cloth via adhesive agent and laminating synthetic resin members on the fibers. Incidentally, as then adhesive agent used here, for example, synthetic rubber adhesive agent or thermosetting adhesive agent can be used.

Here, as shown in FIG. 1, a belt anchor 23 is attached to the side frame 21 so as to penetrate the side frame cover 212 in a thickness direction thereof, and a base portion of a seat belt 24 is fixed to the belt anchor 23 via a bolt. Therefore, when an impact due to a rear-end collision or the like is applied, the belt anchor 23 is pulled in a direction perpendicular to an axial direction of the belt anchor 23 due to a load applied to the seat belt 24. Then, at the joint portions (the C portion and the D portion in FIG. 2) of the side frame base body 211 composed of a metal member and the side frame cover 212 composed of a synthetic resin member, the side frame cover 212 is forced to move away from the side frame base body 211 but, since they are joined by the adhesive agent, the force of the impact is partially consumed as a force that separates them away from each other against joining forces of the adhesive agent. As a result, the impact force is relaxed.

At this time, it is possible to make the adhesive agent used at the C portion and the D portion in FIG. 2 adhere to only one of the planar members 2 and 3 made of synthetic resin in the laminated body 1 configuring the side frame cover 212, the one facing the side frame base body 211, or it is possible to impregnate the adhesive agent from one of the planar members 2 and 3 made of synthetic resin to the planer member 4 made of cloth. That is, the joining force between the side frame base body 211 and the side frame cover 212 can be adjusted by adjusting a distance within which the adhesive agent serves, and thus the force needed to separate them away from each other can be adjusted according to a site in which the structural member of this embodiment is used.

Furthermore, in this embodiment, the side frame cover 212 is not composed of only a synthetic resin laminated body, but is composed of the laminated body 1 in which the planar member 4 made of cloth which is different material from the two sheets of planar members 2 and 3 made of synthetic resin is sandwiched therebetween via adhesive agent. Therefore, since the impact force is not only consumed as the force that separates the side frame base body 211 composed of a metal member and the side frame cover 212 composed of a synthetic resin member from each other at the joint portions thereof (the C portion and the D portion in FIG. 2), but also consumed as a force that causes delamination between one planar member 2 made of synthetic resin and the planar member 4 made of cloth and between the other planar member 3 made of synthetic resin and the planar member 4 made of cloth, which configure the side frame cover 212, high impact-absorbing action can be developed.

Further, since the side frame cover 212 is not composed of only a synthetic resin laminated body, but is composed of the laminated body 1 in which the planar member 4 made of cloth which is different material from the two sheets of planar members 2 and 3 made of synthetic resin is sandwiched therebetween, it has high rigidity. That is, when the side frame cover 212 receives an impact force, the side frame cover 212 not only consumes the impact force as such a force that causes delamination as described above, but also has such a degree or more of rigidity as a conventional metal frame member is required to have. This rigidity will be further explained in detail in Test Example 3 described later.

Figure 4:
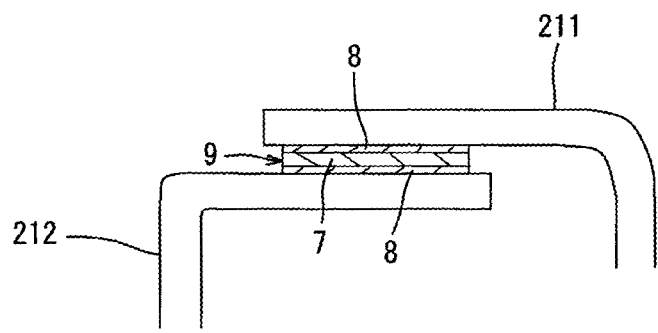
FIG. 4 is an explanatory diagram of an adhesive layer used in the structural member of the embodiment.
Figure 5A:
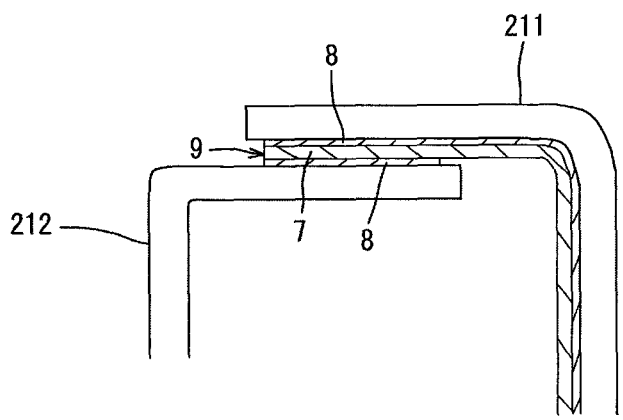
FIG. 5A is a diagram showing a state where a planar member made of cloth configuring the adhesive layer has been pulled out along an inner face of a side frame base body and bonded to the inner face.
Figure 5B:
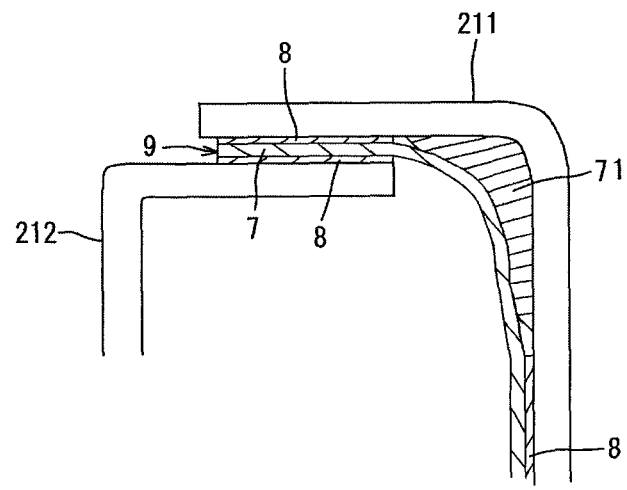
FIG. 5B is a diagram showing a state where a space between the side frame base body and the planar member made of cloth configuring the adhesive layer has been filled with foamed synthetic resin.

In the above embodiment, the joint portions (the C portion and the D portion in FIG. 2) of the side frame base body 211 composed of a metal member and the side frame cover 212 composed of a synthetic resin member are joined by only adhesive agent, however, as shown in FIG. 4, they may be joined via an adhesive layer 9 obtained by impregnating a planar member 7 made of cloth with adhesive agent 8. In this case, when the impact force is applied, delamination is caused between the planar member 7 made of cloth and the adhesive agent 8 configuring the adhesive layer 9, and therefore an impact-absorbing action can be further enhanced. Incidentally, as described above, it is preferable that the planar member 7 made of cloth used here is selected from a bi-axial woven fabric, a tri-axial woven fabric, a tetra-axial woven fabric or a three-dimensional solid knitted fabric. Particularly, it is more preferable that the bi-axial woven fabric is used. Further, the adhesive layer 9 may not be disposed only at the portion where the side frame base body 211 and the side frame cover 212 overlap each other, but, as shown in FIG. 5A, the planar member 7 made of cloth may be pulled out beyond the overlapping portion by a predetermined length along an inner face of the side frame base body 211 composed of a metal member, and bonded on the inner face of the side frame base body 211 via the adhesive agent 8. Especially, this contributes to enhancement in surface rigidity when the side frame base body 211 composed of a thin plate made of ferrous metal material or nonferrous metal material is adopted as described above. As a result of this, the thickness of the side frame base body 211 can be further reduced. Furthermore, as shown in FIG. 5B, such a configuration can be adopted in which the planar member 7 made of cloth is pulled out beyond the portion where the side frame base body 211 and the side frame cover 212 overlap each other, and a space between the side frame base body 211 and the planar member 7 made of cloth is filled with foamed synthetic resin 71 such as foamed polystyrene. In this case, without weight increase, surface rigidity can be further enhanced, and the thickness of the side frame base body 211 can be further reduced.

Next, tests (Test Example 1 and Test Example 2) that have examined materials for a planar member made of cloth suitable for causing delamination will be explained.

Test Example 1

A laminated body (Test Example 1) was manufactured by sandwiching a bi-axial woven fabric (Longitudinal: 20/inch, Horizontal: 20/inch) formed from polyethylene naphthalate (PEN) fibers (1100 dtex) produced by Teijin Limited between fiber-reinforced plastics containing unsaturated polyester resin for general lamination (Product Name: "POLYKYUTO PC-420 TN" produced by Kyushu Toryo Kogyo Co., Ltd.) as matrix. Specifically, molding was made by joining glass fibers which were reinforcing material to both faces of the bi-axial woven fabric by synthetic rubber adhesive agent (Trade Name: AIRTAC 2, spraying type synthetic rubber adhesive agent, manufactured by Airtech Corporation, USA) and laminating the above unsaturated polyester resin for general lamination on the glass fibers. Test pieces were prepared from this laminated body. As the test pieces, ones in which a taking-up direction (a roll direction) of a roll of a bi-axial woven fabric provided in a rolled state was a tensile direction, ones in which an oblique direction (a bias direction) was the tensile direction, and ones in which a widthwise direction was the tensile direction ware prepared in threes (n1, n2, n3). The tensile stress and the Izod impact strength of each test piece were obtained. The tensile stress was measured by the tensile test specified in JIS K7113. As the test pieces used in the tensile test, ones specified in JIS K7139 (Citation Standard ISO 527-2) were prepared. The Izod impact strength was measured by Izod Impact Test specified in JIS K7110. As the test pieces used in Izod Impact Test, ones specified JIS K7139 (Citation Standard ISO 180) were prepared. The tensile stresses are as shown in Table 1. Incidentally, in Table 1, "t" denotes the thickness of each test piece (the thickness as the laminated body) and "Wc" denotes the width of each test piece. Table 2 shows a tensile stress of a laminated body obtained by laminating planar members made of synthetic resin without intervening a bi-axial woven fabric therebetween, specifically, a laminated body (a homogeneous laminated body (Comparative Example 1)) molded by joining glass fibers to each other using the same adhesive agent as described above and laminating unsaturated polyester resin for general lamination on them.

Figure 6A:
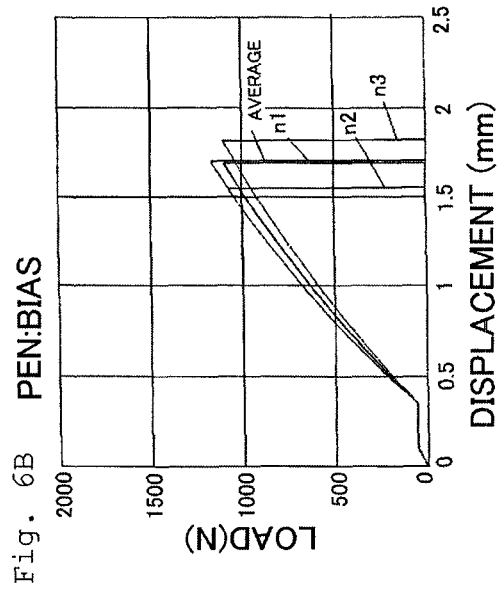
FIGS. 6A to 6C are graphs showing results of tensile stresses of respective test pieces of Test Example 1.
Figure 6B:
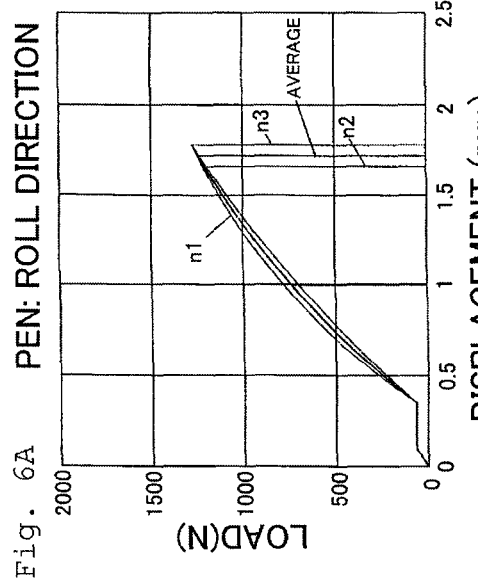
Figure 6C:
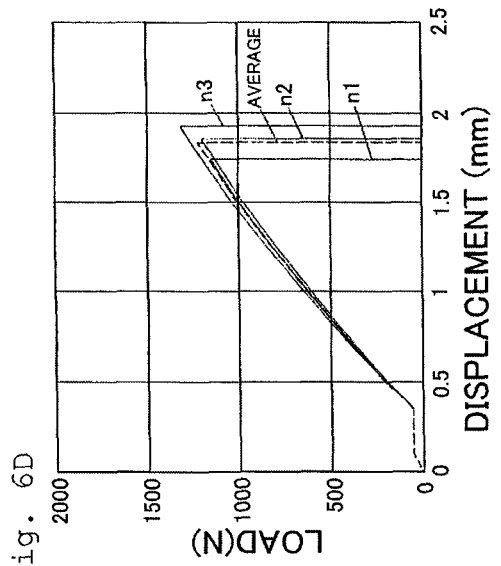
Figure 6D:
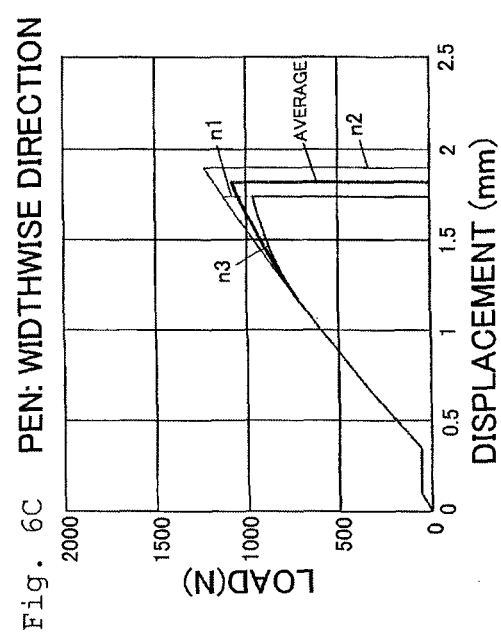
FIG. 6D is a graph showing tensile stresses of respective test pieces in Comparative Example 1.
Figure 7A:
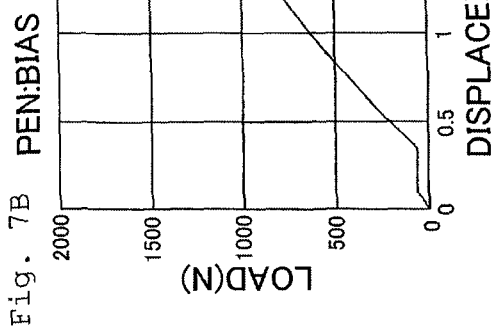
FIGS. 7A to 7D are graphs showing only respective average values taken from FIGS. 6A to 6D.
Figure 7B:
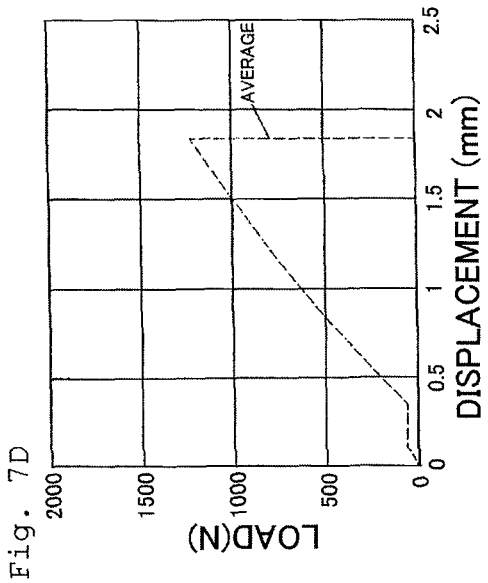
Figure 7C:
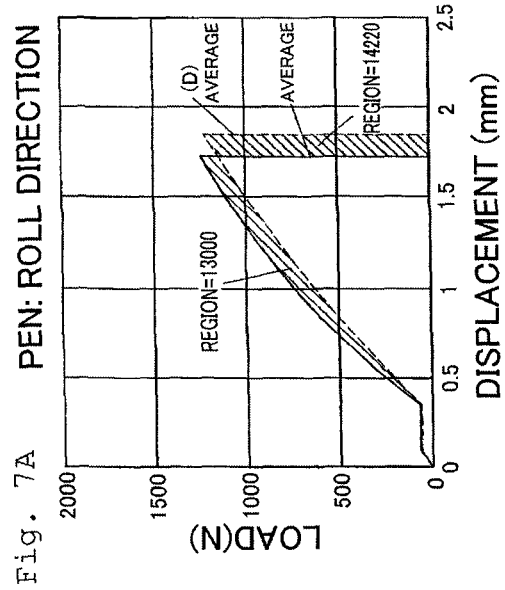
Figure 7D:
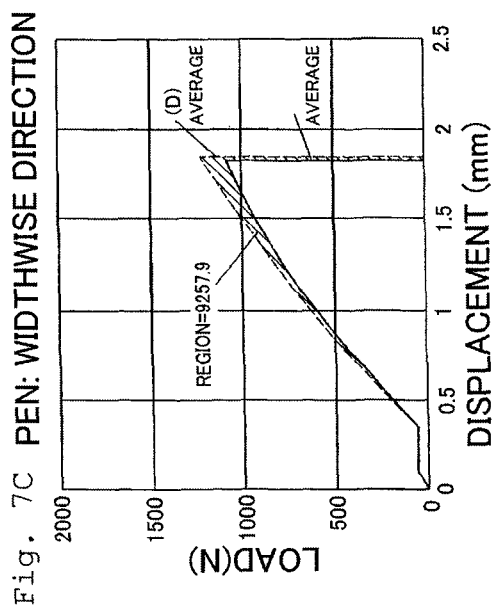

FIGS. 6A to 6C are graphs of results of tensile stresses in Table 1, where an average tensile stress of three test pieces is also obtained in each direction. FIG. 6D is a graph of a tensile stress in Table 2. Incidentally, since the homogeneous laminated body shown in FIG. 6D does not include the bi-axial woven fabric laid between layers and a cut-out test piece does not have directionality, measurement about three test pieces cut out with the same size as the above without considering the cutting-out direction is performed and an average value of the values obtained by the measurement is obtained.

FIG. 7 is a graph showing only the respective average values taken from FIG. 6. Particularly, FIGS. 7A to 7C display the respective average values together with the average value of the homogeneous laminated body shown in FIG. 7D.

In the above results, it was first found from Table 1 and Table 2 that, while the tensile stress of the homogeneous laminated body of Comparative Example 1 was 75.9 MPa in the roll direction, the tensile stress of the laminated body of Test Example 1 was 52.4 MPa in the roll direction, 48.8 MPa in the bias direction and 57.4 MPa in the widthwise direction according to the average value of the respective test pieces, and the lowering rates thereof were 31.0%, 35.7% and 24.4%, respectively. The fact that the tensile stress of the heterogeneous laminated body formed by performing lamination using adhesive agent through the bi-axial woven fabric becomes smaller than that of the homogeneous laminated body shows that delamination was caused between the bi-axial woven fabric and each fiber-reinforced plastic (glass fiber), and the lowered tensile stress corresponds to absorbed impact energy. As compared with the homogeneous laminated body, it was found from FIG. 7 that the energy absorbing amount of each test piece in Test Example 1 was 1220 N·mm in the roll direction shown in FIG. 7A, 18433 N·mm in the bias direction shown in FIG. 7B and 9257.9 N·mm in the widthwise direction shown in FIG. 7C.

TABLE 1

| Test Example 1 | Roll Direction | | | Bias Direction | | | Widthwise Direction | | |
|---|---|---|---|---|---|---|---|---|---|
| | n1 | n2 | n3 | n1 | n2 | n3 | n1 | n2 | n3 |
| P (Breaking Load: N) | 1411.9 | 1218.8 | 1275.1 | 1166.5 | 1049.9 | 1102.2 | 1126.3 | 1150.4 | 961.4 |
| t (Plate Thickness: mm) | 2.65 | 2.45 | 2.35 | 2.35 | 2.35 | 2.10 | 1.90 | 1.90 | 1.75 |
| Wc (Width: mm) | 10.05 | 10.05 | 9.90 | 10.05 | 10.00 | 10.05 | 10.15 | 10.15 | 10.15 |
| $\sigma_{tB}$ (Tensile Strength: MPa) | 53.0 | 49.5 | 54.8 | 49.4 | 44.7 | 52.2 | 58.4 | 59.7 | 54.1 |
| | | 52.4 | | | 48.8 | | | 57.4 | |

TABLE 2

| Comparative Example 1 | Roll Direction | | |
|---|---|---|---|
| | n1 | n2 | n3 |
| P(Breaking Load: N) | 1150.4 | 1202.7 | 1319.4 |
| t(Plate Thickness: mm) | 1.50 | 1.65 | 1.70 |
| Wc(Width: mm) | 9.95 | 10.00 | 10.00 |
| $\sigma_{tB}$(Tensile Strength: MPa) | 77.1 | 72.9 | 77.6 |
| | | 75.9 | |

On the other hand, as shown in Table 3 and Table 4, it was found that, while the Izod impact strength of the homogeneous laminated body in Comparative Example 1 was 46.9 kJ/m$^2$, the Izod impact strength of the laminated body in Test Example 1 was 33.7 kJ/m$^2$ in the roll direction, 31.9 kJ/m$^2$ in the bias direction and 28.8 kJ/m$^2$ in the widthwise direction, and the lowering rates thereof were 28.1%, 32.0% and 38.6%, respectively. Accordingly, it was found that the laminated body of Test Example 1 was lower in Izod impact strength than the homogeneous laminated body of Comparative Example 1 and the lowered amount of the Izod impact strength contributed to absorbing impact energy.

TABLE 3

| Test Example 1 | Roll Direction | | | Bias Direction | | | Widthwise Direction | | |
| --- | --- | --- | --- | --- | --- | --- | --- | --- | --- |
| | n1 | n2 | n3 | n1 | n2 | n3 | n1 | n2 | n3 |
| E (Impact Energy: deg) | 136.5 | 137.0 | 139.0 | 137.5 | 139.5 | 139.5 | 142.0 | 140.5 | 139.0 |
| E (Impact Energy: J) | 0.8070 | 0.7714 | 0.6331 | 0.7365 | 0.5995 | 0.5995 | 0.4358 | 0.5331 | 0.6331 |
| t (Plate Thickness: mm) | 2.10 | 2.35 | 2.10 | 2.05 | 2.00 | 2.00 | 1.85 | 1.80 | 1.90 |
| b (Width: mm) | 10.00 | 10.10 | 10.00 | 10.05 | 10.00 | 10.00 | 10.00 | 10.00 | 10.00 |
| $a_{iu}$ (Impact Strength: kJ/m$^2$) | 38.4 | 32.5 33.7 | 30.1 | 35.7 | 30.0 31.9 | 30.0 | 23.6 | 29.6 28.8 | 33.3 |

TABLE 4

| Comparative Example 1 | Roll Direction | | |
| --- | --- | --- | --- |
| | n1 | n2 | n3 |
| E (Impact Energy: deg) | 137.0 | 134.0 | 133.5 |
| E (Impact Energy: J) | 0.7714 | 0.9888 | 1.0261 |
| t (Plate Thickness: mm) | 1.90 | 1.95 | 2.05 |
| b (Width: mm) | 10.05 | 10.05 | 10.05 |
| $a_{iu}$ (Impact Strength: kJ/m$^2$) | 40.4 | 50.5 46.9 | 49.8 |

Test Example 2

A laminated body (Test Example 2) formed by sandwiching a tetra-axial woven fabric formed using aramid fiber (Trademark "TECHNORA" produced by TEIJIN TECHNO PRODUCTS LIMITED) instead of the bi-axial woven fabric of Test Example 1 was manufactured. In Test Example 2, ones in which a direction extending along a taking-up direction (a roll direction) of a roll of the tetra-axial woven fabric was the tensile direction, ones in which an oblique direction (a bias direction) was the tensile direction and ones in which a widthwise direction was the tensile direction were prepared in threes (n1, n2, n3). The tensile stress and the Izod impact strength of each test piece were obtained. The standard of the test pieces and a method of each test were exactly the same as those of Test Example 1. Table 5 shows the result of tensile stresses obtained from the tensile test.

TABLE 5

| Test Example 2 | Roll Direction | | | Bias Direction | | | Widthwise Direction | | |
| --- | --- | --- | --- | --- | --- | --- | --- | --- | --- |
| | n1 | n2 | n3 | n1 | n2 | n3 | n1 | n2 | n3 |
| P (Breaking Load: N) | 1971.0 38 | 1432.0 19 | 1657.2 81 | 1818.1 82 | 1613.0 33 | 1637.1 68 | 1383.7 49 | 1347.5 46 | 1182.6 23 |
| t (Plate Thickness: mm) | 2.45 | 2.25 | 2.40 | 2.50 | 2.30 | 2.00 | 2.10 | 2.10 | 2.00 |
| Wc (Width: mm) | 10.15 | 10.00 | 10.00 | 10.05 | 10.05 | 9.95 | 10.05 | 10.05 | 10.00 |
| $\sigma_{tB}$ (Tensile Strength: MPa) | 79.3 | 63.6 70.7 | 69.1 | 72.4 | 69.8 74.8 | 82.3 | 65.6 | 63.8 62.8 | 59.1 |

The tensile stress of the homogeneous laminated body of Comparative Example 1 was 75.9 MPa (see Table 2), but it was found from Table 5 that the tensile stress of the laminated body of Test Example 1 was 70.7 MPa in the roll direction, 74.8 MPa in the bias direction and 62.8 MPa in the widthwise direction according to the respective average value of the respective test pieces and the lowering rates were 6.9%, 1.4% and 17.3%, respectively. In Test Example 2, it was found that the tensile stress of the heterogeneous laminated body obtained by performing lamination of the tetra-axial woven fabric using adhesive agent was smaller than the tensile stress of the homogeneous laminated body, where delamination was caused between the tetra-axial woven fabric and each fiber-reinforced plastic (glass fiber) and impact energy could be absorbed by the amount corresponding to the lowered tensile stress.

However, when the laminated body including the intervening bi-axial woven fabric of Test Example 1 and the laminated body including the intervening tetra-axial woven fabric of Text Example 2 are compared with the homogeneous laminated body of Comparative Example 1 regarding the lowering rate of the tensile stress, the lowering rate of the laminated body including the intervening bi-axial woven fabric is larger than that of the laminated body including the intervening tetra-axial woven fabric, so that it can be said that the laminated body including the intervening bi-axial woven fabric is more preferable than the laminated body including the intervening tetra-axial woven fabric regarding absorption of impact energy.

However, in both the laminated body of Test Example 1 including the intervening bi-axial woven fabric and the laminated body of Test Example 2 including the intervening tetra-axial woven fabric, their tensile stresses are lower than that of the homogeneous laminated body of Comparative Example 1, where the lowering rate of Test Example 1 was in a range from 24.4 to 35.7% and the lowering rate of Test Example 2 was in a range from 1.4 to 17.3%. Since it is thought that, when the lowering rate largely exceeds 40%, strength is too low, the lowering rate is preferably 40% or less, more preferably, in a range from 20 to 40% including the range of the lowering rate of the bi-axial woven fabric.

On the other hand, as shown in Table 6, the Izod impact strength of the laminated body of Test Example 2 was 44.1 kJ/m² in the roll direction, 48.3 kJ/m² in the bias direction and 49.6 kJ/m² in the lateral direction. Regarding the roll direction, the Izod impact strength of the laminated body of Test Example 2 was lower than the Izod impact strength: 46.9 kJ/m² (see Table 4) of the homogeneous laminated body of Comparative Example 1 by 6.0%, but each Izod impact strength of the laminated body of Test Example 2 regarding the bias direction and the lateral direction exceeded that of the homogeneous laminated body of Comparative Example 1. In both the tests of the tensile stress and the Izod impact strength, therefore, the laminated body of Test Example 1 using the bi-axial woven fabric where the values of the tensile stress and the Izod impact strength are lower than those of the homogeneous laminated body of Comparative Example 1 can develop an impact absorbing action due to delamination more securely. Incidentally, when the lowering rate of the Izod impact strength is too low, strength required originally may not be maintained, so that the lowering rate is preferably 40% or less, more preferably in a range from 20 to 40% including the lowering rate (28.1 to 38.6%) of the bi-axial woven fabric.

TABLE 6

| Test Example 2 | Roll Direction | | | Bias Direction | | | Widthwise Direction | | |
|---|---|---|---|---|---|---|---|---|---|
| | n1 | n2 | n3 | n1 | n2 | n3 | n1 | n2 | n3 |
| E (Impact Energy: deg) | 135.0 | 132.5 | 132.0 | 133.0 | 131.0 | 135.5 | 132.0 | 135.0 | 133.5 |
| E (Impact Energy: J) | 0.9150 | 1.1017 | 1.1400 | 1.0638 | 1.2174 | 0.8788 | 1.1400 | 0.9150 | 1.0261 |
| t (Plate Thickness: mm) | 2.20 | 2.55 | 2.40 | 2.00 | 2.30 | 2.25 | 1.95 | 2.10 | 2.20 |
| b (Width: mm) | 10.00 | 10.10 | 10.00 | 10.00 | 10.05 | 10.00 | 10.00 | 10.00 | 10.00 |
| $a_{iu}$ (Impact Strength: kJ/m²) | 41.6 | 43.2 44.1 | 47.5 | 53.2 | 52.7 48.3 | 39.1 | 58.5 | 43.6 49.6 | 46.6 |

Here, regarding a bi-axial woven fabric single unit and a tetra-axial woven fabric single unit, tensile tests of respective test pieces cut out in the roll direction, in the bias direction and in the widthwise direction were performed like Test Example 1 in order to examine differences between the bi-axial woven fabric and the tetra-axial woven fabric. The results were shown in FIG. 8 to FIG. 10. Incidentally, in FIG. 8 to FIG. 10, display attached with "PEN" shows a test piece of the bi-axial woven fabric and display attached with "TNRB" shows a test piece of the tetra-axial woven fabric. First of all, in comparison about the bi-axial woven fabric, the tensile stress in the bias direction is considerably lower than the tensile stresses in the roll direction and in the widthwise direction. On the other hand, in the case of the tetra-axial woven fabric, the tensile stress in the bias direction is highest, and the tensile stresses in the roll direction and in the widthwise direction are small.

It is understood from these matters that stresses in both the bi-axial woven fabric and the tetra-axial woven fabric varies according to a difference in tensile direction. Therefore, when an impact is applied to each fabric, fibers of each woven fabric are twisted toward a weaker stress side and the twist functions as a force that causes fibers to delaminate from the planar member made of synthetic resin. When the bi-axial woven fabric and the tetra-axial woven fabric are compared with each other, the former is considerably larger in difference in stress according to the tensile direction than the latter. Accordingly, upon receipt of an impact, twist of the bi-axial woven fabric is larger than that of the tetra-axial woven fabric, from which, it is understood that the bi-axial woven fabric causes delamination more easily than the tetra-axial woven fabric.

Test Example 3

Next, a rigidity test of a side frame cover 212 comprising the laminated body 1 of the planar members 2 and 3 made of synthetic resin and the planar member 4 made of cloth that was used in Test Example 1 was performed.

Specifically, a side frame cover 212 having an approximately L shape in section similar to that shown in FIGS. 1 and 2 was manufactured by using the same laminated body as used in Test Example 1. This side frame cover 212 was joined via thermosetting adhesive agent to an iron side frame base body 211 having a plate thickness of 1.2 mm and an approximately U shape, as shown in FIG. 2. Then, a belt anchor 23 was attached to a side frame 21 so as to penetrate the side frame cover 212 in a thickness direction thereof, and a base portion of a seat belt 24 was fixed to the belt anchor 23 via a bolt. In such a situation, a load was applied to the seat belt 24 such that the belt anchor 23 was pulled in a direction perpendicular to an axial direction of the belt anchor 23 (a direction of Arrow A in FIG. 1).

As a result, a large deformation did not occur in the side frame base body 211 and a crack did not occur in the side frame cover 21 and only such deformation as diametrical expansion of a through-hole of the belt anchor 22 was generated. Accordingly, it was found that the laminated body in which the bi-axial woven fabric was sandwiched between the planar members made of synthetic resin, which was used in the above-mentioned embodiment, could obtain high rigidity in addition to the impact absorbing action due to the delaminating action. A conventional side frame uses a side frame base body having a plate thickness of 2.3 mm and the same shape as the side frame base body 211 of this embodiment, but, when the side frame 21 has a structure in which the side frame base body 211 of this embodiment is combined with the laminated body via adhesive agent even though the side frame base body 211 has a plate thickness of 1.2 mm, the side frame 21 has the same degree or more of rigidity as the conventional side frame has in a loading test under the above conditions. Therefore, by adopting the configuration of the structural member of this embodiment, it is possible to reduce the plate thickness of a metal member or to use metal light in weight, which is effective to achieve weight reduction of a structural member (frame member) and weight reduction of the entire vehicle body.

Test Example 4

In Test Example 4, materials for the planar member 4 made of cloth suitable for making rigidity higher than that of the laminated body in Test Example 1 by laminating the planar member 4 made of cloth with the planar members 2 and 3 made of synthetic resin was examined.

Specifically, in place of the bi-axial woven fabric (Longitudinal: 20/inch, Horizontal: 20/inch) formed from polyethylene naphthalate (PEN) fibers (1100 dtex) produced by Teijin Limited, which was used in Test Example 1, a bi-axial woven fabric manufactured by using the same PEN fibers such that the density was lower (Longitudinal: 17/inch, Horizontal: 17/inch) was used. Then, a laminated body was manufactured by sandwiching this bi-axial woven fabric having a lower density between fiber-reinforced plastics containing unsaturated polyester resin for general lamination as matrix which were the same as those in Test Example 1.

As test pieces of the laminated body thus manufactured, ones in which a taking-up direction (a roll direction) of a roll of a bi-axial woven fabric provided in a rolled state was a tensile direction, ones in which an oblique direction (a bias direction) was the tensile direction, and ones in which a widthwise direction was the tensile direction were prepared in threes (n1, n2, n3). The tensile stress and the Izod impact strength of each test piece were obtained. Incidentally, the standard of the test pieces and a method of each test were exactly the same as those of Test Example 1. Table 7 shows the results of the tensile stresses, and Table 8 shows the results of the Izod impact strengths. Further, regarding the tensile stresses, the results in Table 7 are graphically shown in FIG. 11.

TABLE 7

| Test Example 4 | Roll Direction | | | Bias Direction | | | Widthwise Direction | | |
|---|---|---|---|---|---|---|---|---|---|
| | n1 | n2 | n3 | n1 | n2 | n3 | n1 | n2 | n3 |
| P (Breaking Load: N) | 1808.0 | 1649.0 | 1106.0 | 1508.0 | 1515.0 | 1140.0 | 1290.0 | 1273.0 | 1708.0 |
| t (Plate Thickness: mm) | 2.35 | 2.20 | 2.00 | 2.20 | 2.20 | 2.10 | 2.10 | 2.00 | 2.00 |
| Wc (Width: mm) | 9.80 | 9.90 | 9.65 | 10.00 | 9.90 | 9.90 | 10.10 | 10.00 | 10.00 |
| $\sigma_{tB}$ (Tensile Strength: MPa) | 78.5 | 75.7 70.5 | 57.3 | 68.5 | 69.6 64.3 | 54.8 | 60.8 | 63.7 70.0 | 85.4 |

TABLE 8

| Test Example 4 | Roll Direction | | | Bias Direction | | | Widthwise Direction | | |
|---|---|---|---|---|---|---|---|---|---|
| | n1 | n2 | n3 | n1 | n2 | n3 | n1 | n2 | n3 |
| E (Impact Energy: deg) | 134.5 | 135.5 | 131.5 | 137.5 | 134.0 | 134.0 | 133.5 | 133.5 | 132.5 |
| E (Impact Energy: J) | 0.9519 | 0.8788 | 1.1785 | 0.7365 | 0.9888 | 0.9888 | 1.0261 | 1.0261 | 1.1017 |
| t (Plate Thickness: mm) | 1.95 | 2.00 | 1.95 | 1.80 | 2.00 | 2.05 | 1.95 | 2.20 | 2.05 |
| b (Width: mm) | 9.90 | 9.85 | 9.80 | 9.75 | 9.85 | 9.80 | 9.85 | 10.00 | 9.95 |
| $a_{iu}$ (Impact Strength: kJ/m$^2$) | 49.3 | 44.6 51.9 | 61.7 | 42.0 | 50.2 47.1 | 49.2 | 53.4 | 46.6 51.4 | 54.0 |

First, by comparison between Table 1 and Table 7, it was found that the tensile stress of each test piece using the low-density PEN fibers ("PEN 17×17") of the Test Example 4 were higher than that of each test piece using the high-density PEN fibers of Test Example 1, and that, even though the bi-axial woven fabric was used, the same degree of tensile stress as the tetra-axial woven fabric of Test Example 2 has (Table 5) was obtained. Further, the Izod impact strength of each test piece of Test Example 4 was considerably higher than that of each test piece of the Test Example 1 (Table 3), and an obtained average result of the Izod impact strengths was higher than that of the Izod impact strengths in the case of using the tetra-axial woven fabric of Test Example 2 (Table 6). From this, it was found that a bi-axial woven fabric of lower-density PEN fibers like Test Example 1 could obtain higher rigidity. Therefore, if a synthetic resin member is joined to a metal member by using the laminated body of Test Example 4, higher rigidity can be obtained than if they are joined by using the laminated body of Test Example 1. As a result, it becomes possible to further reduce the thickness of a metal member so that further weight reduction can be achieved. Whether to use a laminated body suitable for enhancing rigidity like Test Example 4 or to use a laminated body having high impact absorption owing to generation of delamination like Test Example 1 can arbitrarily be chosen according to intended use.

Figure 8:
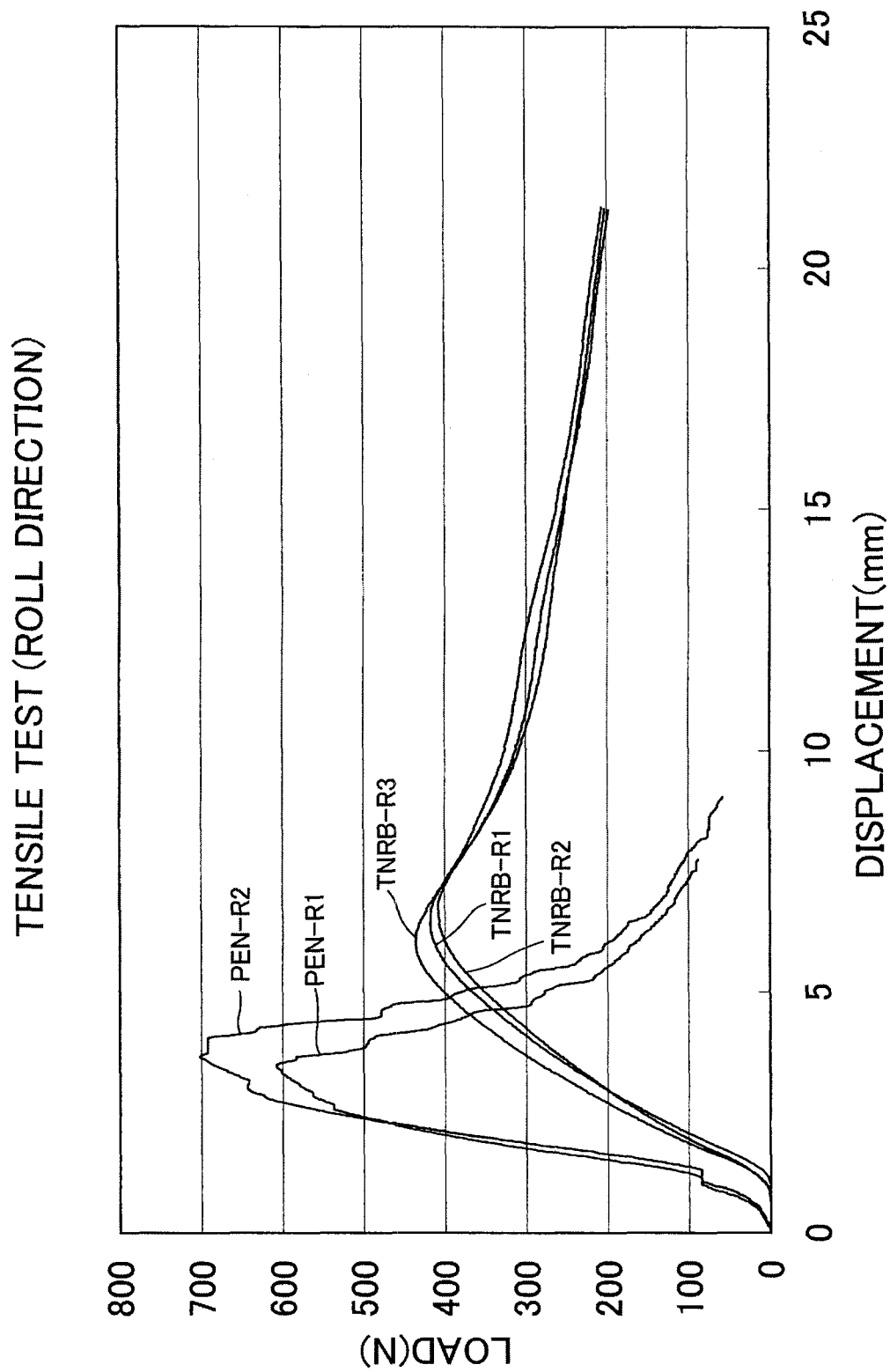
FIG. 8 is a graph showing a result of tensile tests in roll direction of a bi-axial woven fabric single body and a tetra-axial woven fabric single body used in Test Example 1 and Test Example 2.
Figure 9:
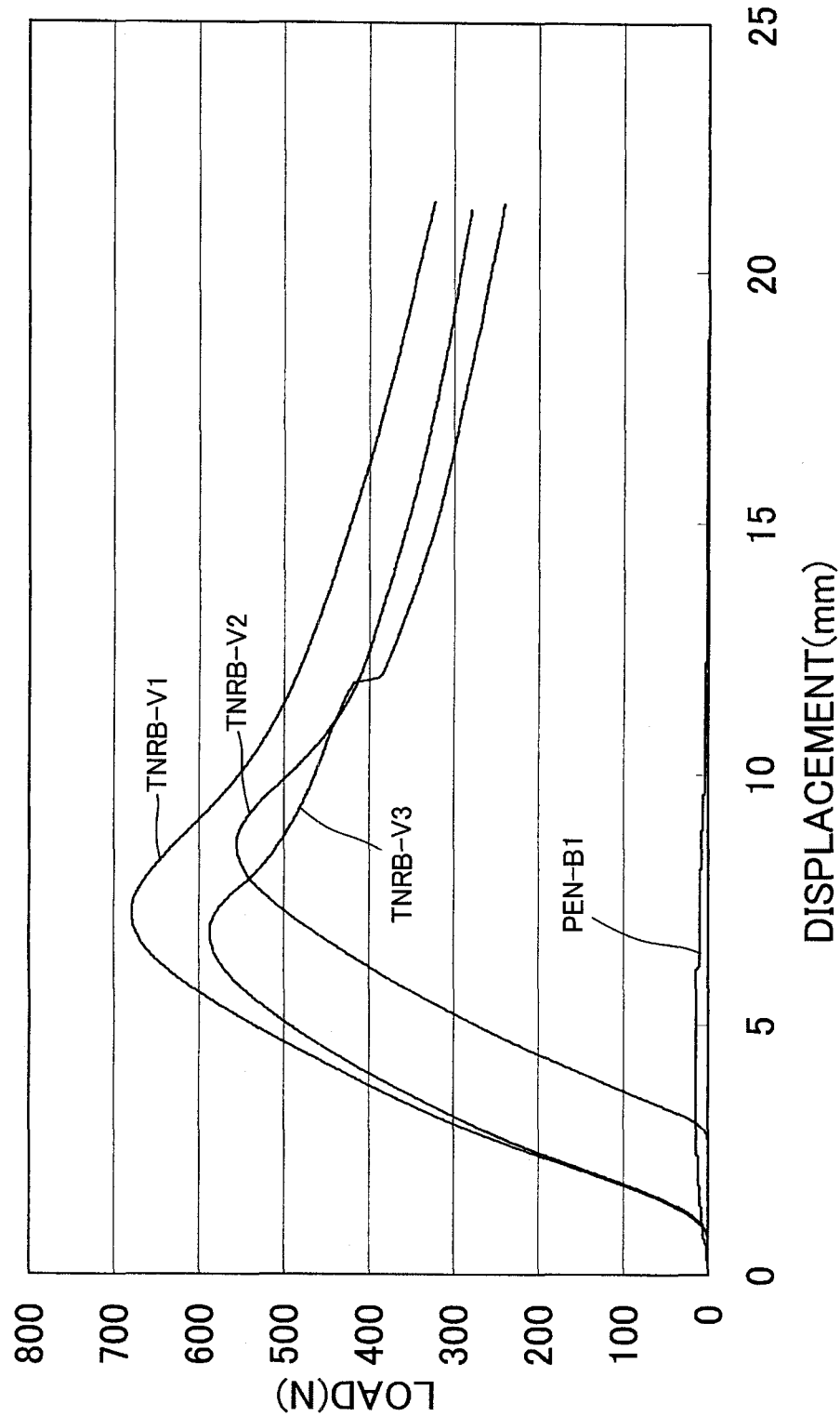
FIG. 9 is a graph showing a result of tensile tests in bias direction of the bi-axial woven fabric single body and the tetra-axial woven fabric single body used in Test Example 1 and Test Example 2.
Figure 10:
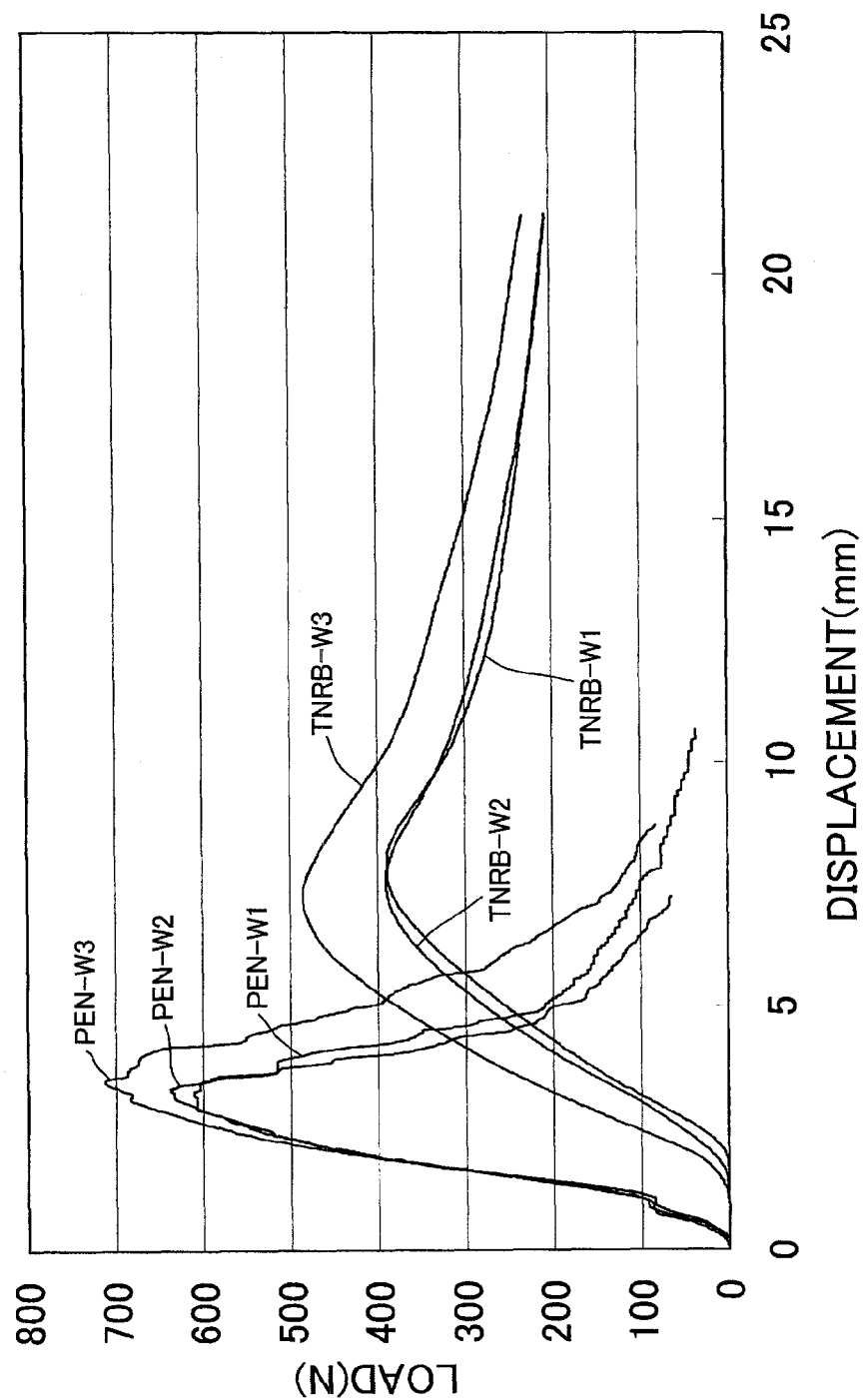
FIG. 10 is a graph showing a result of tensile tests in widthwise direction of the bi-axial woven fabric single body and the tetra-axial woven fabric single body used in Test Example 1 and Test Example 2.
Figure 12:
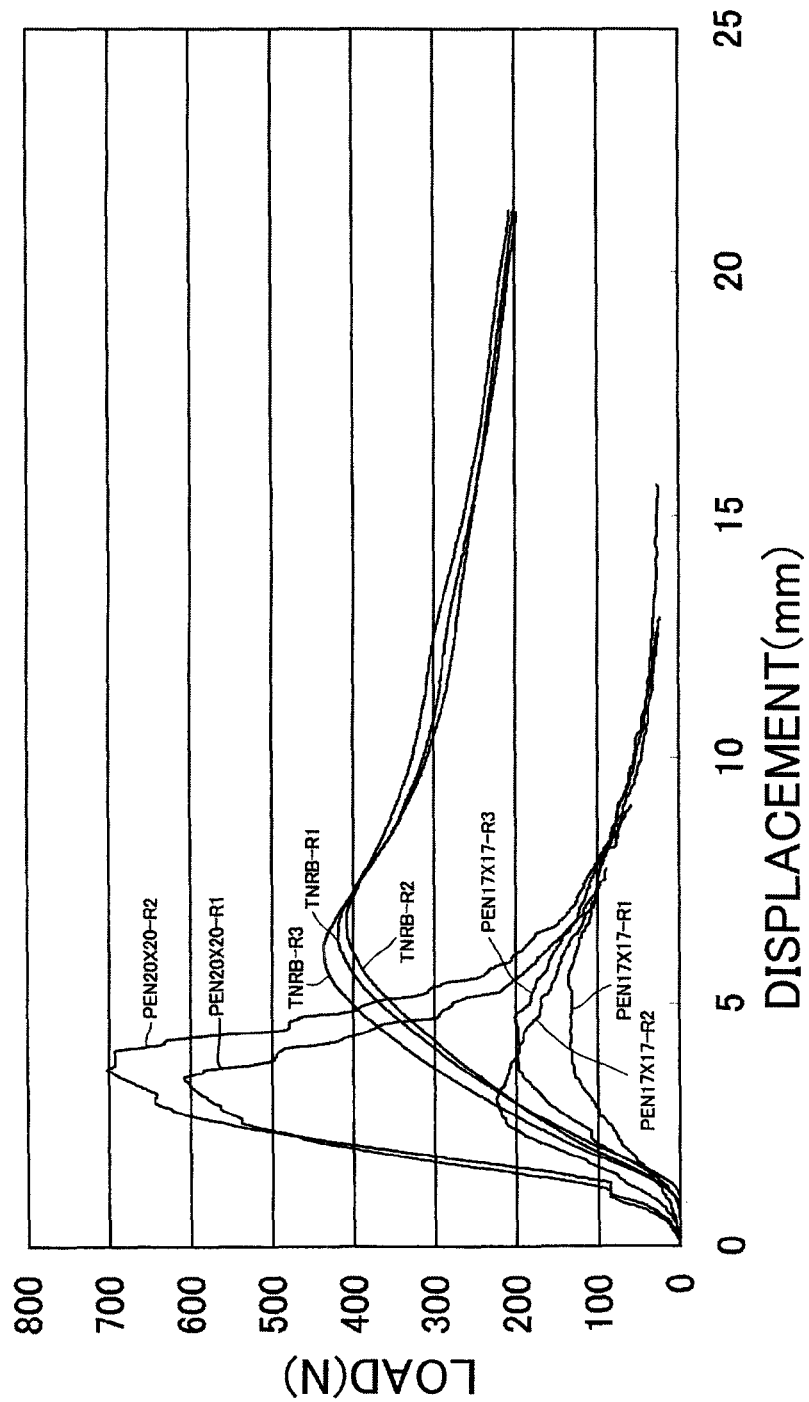
FIG. 12 is a graph showing tensile stresses in a roll direction of a low-density PEN fiber ("PEN 17×17") single roll of Text Example 4.
Figure 13:
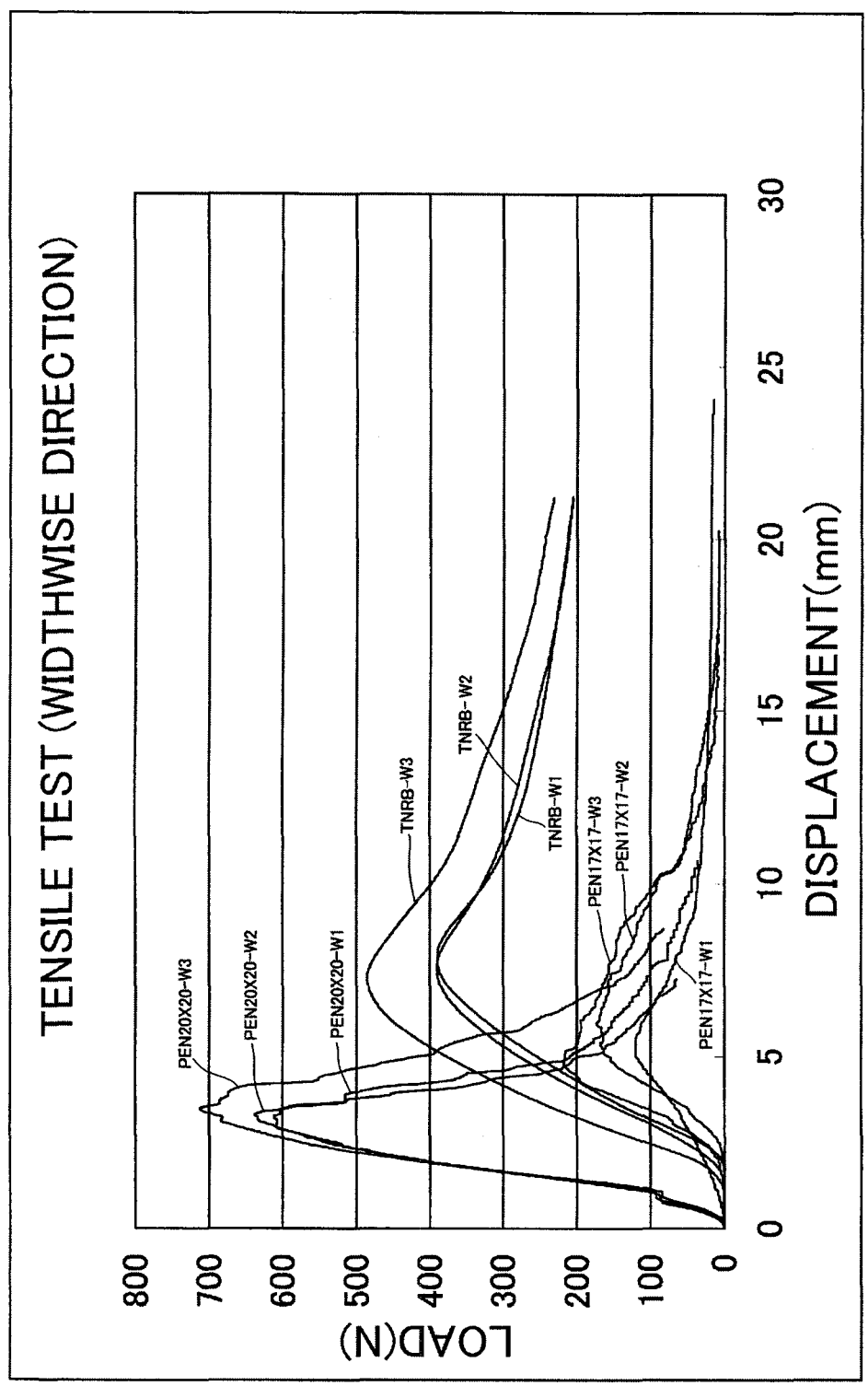
FIG. 13 is a graph showing tensile stresses in a widthwise direction of the low-density PEN fiber ("PEN 17×17") single roll of Text Example 4.

FIGS. 12 and 13 are graphs showing tensile stresses of the low-density PEN fiber ("PEN 17×17") single roll of Test Example 4, FIG. 12 showing the result of a tensile stress in a roll direction, FIG. 13 showing the result thereof in a widthwise direction. Incidentally, the figures also show the results of tensile stresses of the high-density PEN fiber ("PEN 20×20") single roll of Test Example 1 and the tetra-axial woven fabric (TNRB) (the same as shown in FIGS. 8 and 10). From these figures, it is found that the tensile stress of the low-density PEN fiber ("PEN 17×17") single roll of Test Example 4 is about ⅓ of that of the high-density PEN fiber ("PEN 20×20") of Test Example 1 and about ½ of that of the tetra-axial woven fabric (TNRB).

Figure 14:
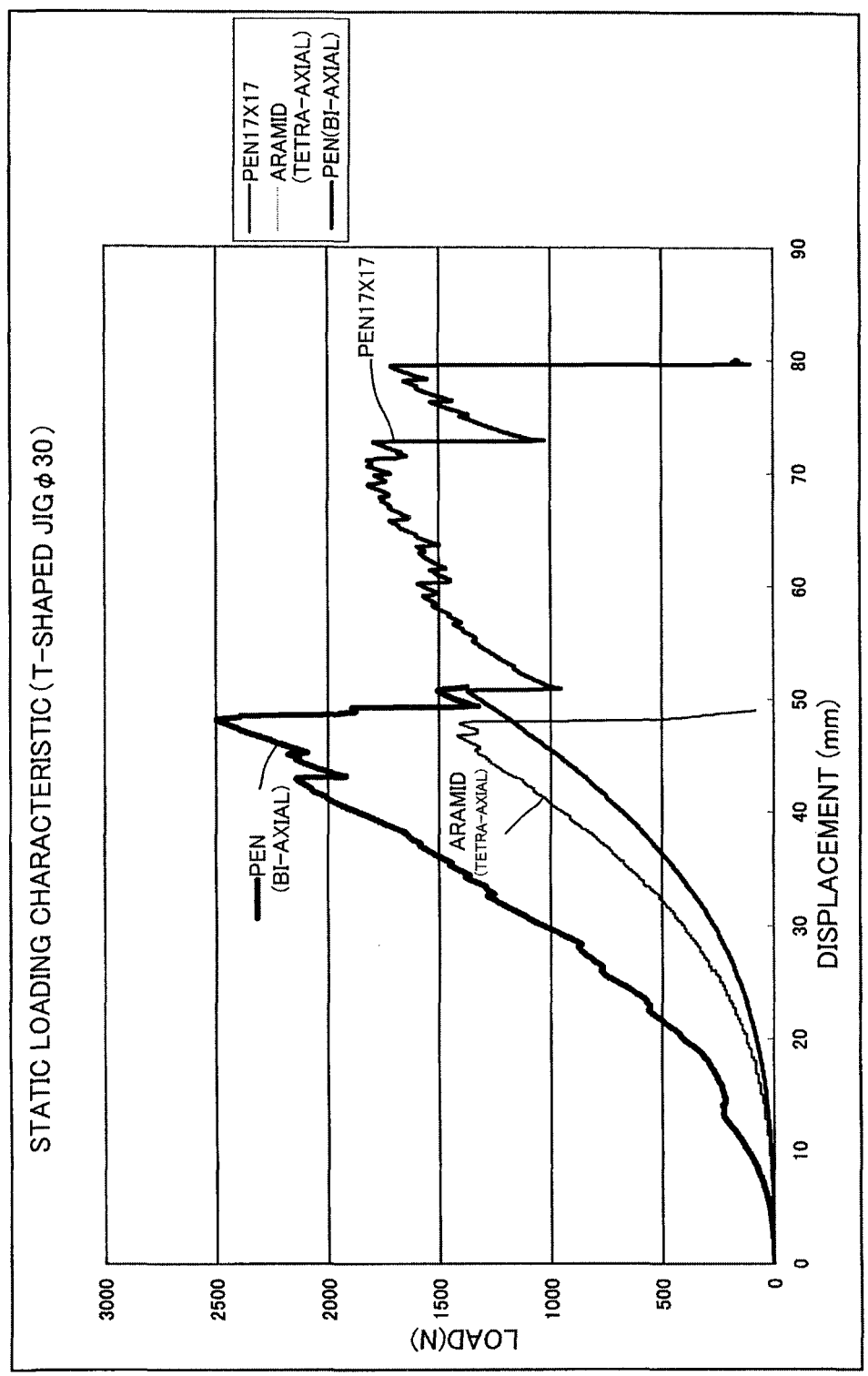
FIG. 14 is a graph showing loading characteristics of the low-density PEN fiber ("PEN 17×17") of Test Example 4, a high-density PEN fiber ("PEN 20×20") of Test Example 1 and a tetra-axial woven fabric (TNRB) when each of them is stretched between frames disposed opposite to each other and pressed by a pressure plate having a diameter of 30 mm.

FIG. 14 is a graph showing loading characteristics of the low-density PEN fiber ("PEN 17×17") of Test Example 4, the high-density PEN fiber ("PEN 20×20") of Test Example 1 and the tetra-axial fabric (TNRB) when each of them is stretched between frames disposed opposite to each other and pressed by a pressure plate having a diameter of 30 mm. From this figure, it was found that the high-density PEN fiber ("PEN 20×20") of Test Example 1 was most able to bear a pressure force and the tetra-axial fabric and the low-density PEN fiber ("PEN 17×17") of Test Example 4 were less able to bear a pressure force.

From FIGS. 12 to 14, it can be said that the low-density PEN fiber ("PEN 17×17") of Test Example 4 is low in tensile stress and less able to bear a pressure force when it is alone, but, from the fact that, when it forms a laminated body with synthetic resins, the area of direct joining of the synthetic resins is large, it can be thought that the low-density PEN fiber ("PEN 17×17") of Test Example 4 obtains high tensile stress and high Izod impact strength as the laminated body.

From Test Example 4, when the bi-axial woven fabric formed from low-density PEN fibers ("PEN 17×17") forms a laminated body with synthetic resins, it becomes higher in rigidity than the bi-axial woven fabric formed from high-density PEN fibers ("PEN 20×20"). This applies not only to a lamination of the bi-axial woven fabric with synthetic resins but also to a lamination thereof with metal members. Then, when the side frame base body 211 and the side frame cover 212 are joined to each other via the adhesive layer 9, shown in FIG. 5, obtained by impregnating the planar member 7 made of cloth with adhesive agent 8, a portion that functions to cause delamination easily and a portion that functions to increase rigidity of the side frame base body 211 or the like can be set by partially varying the density of the planar member 7 made of cloth configuring the adhesive layer 9.

Figure 15A:
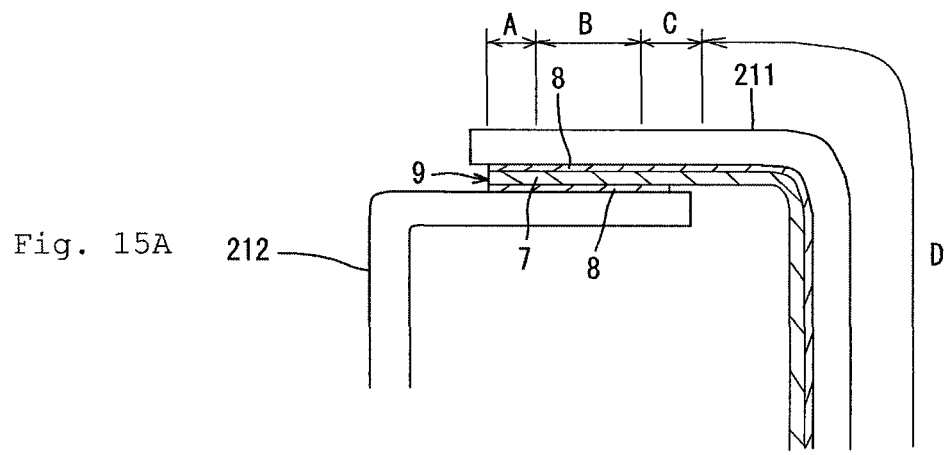
FIGS. 15A to 15C are diagrams showing examples of using adhesive layers in which planar members made of cloth different in density from each other are used.

FIG. 15 shows a structure corresponding the structure shown in FIG. 5, for example, as shown in FIG. 15A, it is possible to use a planar member made of high-density cloth for a portion where the modulus of section sharply increases and use a planar member made of low-density cloth for the other portion. In FIG. 15A, planar members made of high-density (finely-woven) cloth are adopted to "A portion" and "C portion", while planar members made of low-density (coarsely-woven) cloth are adopted to "B portion" and "D portion". As a result, a joining force between the side frame base body 211 and the side frame cover 212 is reduced at the A portion and the C portion, and therefore delamination can be made easy to occur, so that stress distribution can be achieved. On the other hand, the joining force between the side frame base body 211 and the side frame cover 212 is high at the B portion, and the joining force with the side frame base body 211 is high at the D portion, and therefore the rigidities of the side frame base body 211 and the side frame cover 212 can be increased. Therefore, this structure contributes to further reduction in the thickness of the side frame base body 211 to achieve weight reduction.

Figure 15B:
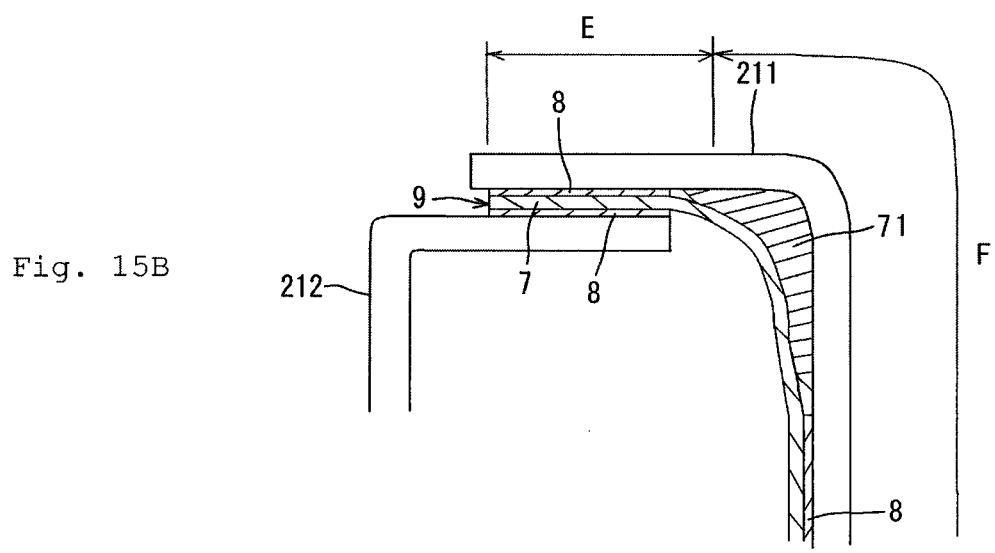
Figure 15C:
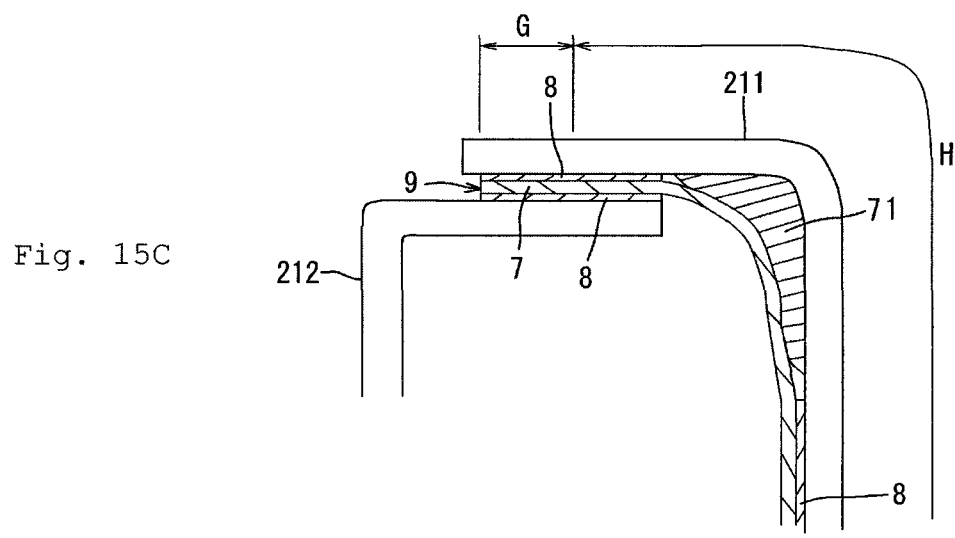

The ranges of use of the planar member made of high-density cloth and the planar member made of low-density cloth are not limited to the ranges in FIG. 15A, and, as shown in FIG. 15B, it is also possible to use the planar member made of high-density cloth at E portion where the side frame base body 211 and the side frame cover 212 overlap each other, and use the planar member made of low-density cloth at F portion. Further, as shown in FIG. 15C, it is also possible to use the planar member made of high-density cloth at a site (G portion) close to an outer end of a range where the side frame base body 211 and the side frame cover 212 overlap each other, and use the planar member made of low-density cloth at the other site (H portion).

In order to set a high-density portion and a low-density portion in a planar member made of cloth, a planar member made of cloth manufactured preliminarily such that partially different densities are present may be used, or a planar member made of cloth may be formed by sewing pieces of cloth having different densities together. Furthermore, the range of high density can be set by putting a plurality of planar members made of cloth partially one on top of another.

Incidentally, in the above embodiment, the example of application of the structural member of the present invention to the side frame 21 has been shown, but the application is not limited to this example, and the structural member of the present invention is obviously applicable to another frame member such as a slide rail of a slide adjuster.

REFERENCE SIGNS LIST

1: Laminated body
2, 3: Planar member made of synthetic resin
4: Planar member made of cloth
10: Seat structure
20: Seat cushion section
21: Side frame
211: Side frame base body
212: Side frame cover
30: Seat back section

The invention claimed is:

1. A structural member comprising, in combination:
   a laminated body provided with a planar member made of cloth and planar members made of synthetic resin laminated on both sides of the planar member made of cloth via adhesive agent and formed in a predetermined shape; and
   a metal member joined to at least a portion of the laminated body via adhesive agent,
   wherein the laminated body and the metal member are provided with protruded portions that are protruded toward each other when the laminated body and the metal member are made to face each other, one protruded portion being overlapped with any site of the other protruded portion, where the laminated body and the metal member are joined to each other.

2. The structural body according to claim 1, wherein the laminated body and the metal member are joined to each other, with the adhesive agent between the laminated body and the metal member impregnated into the planar member made of cloth configuring the laminated body.

3. The structural body according to claim 1, wherein the laminated body and the metal member are joined to each other, with the adhesive agent between the laminated body and the metal member not impregnated into the planar member made of cloth of the laminated body but adhering only to the planar member made of synthetic resin facing the metal member.

4. The structural body according to claim 1, wherein the laminated body and the metal member are joined to each other via an adhesive layer formed by impregnating adhesive agent into the planar member made of cloth.

5. The structural body according to claim 1, wherein the adhesive layer formed by impregnating the adhesive agent into the planar member made of cloth is pulled out beyond a portion where the laminated body and the metal member are overlapped with each other, a pulled-out portion of the adhesive layer and an inner face of the metal member being joined to each other.

6. The structural body according to claim 5, wherein the adhesive layer formed by impregnating the adhesive agent into the planar member made of cloth is pulled out beyond a portion where the laminated body and the metal member are overlapped with each other, and foamed synthetic resin is caused to intervene between the pulled-out portion of the adhesive layer and the inner face of the metal member to join the pulled-out portion of the adhesive layer and the inner face of the metal member to each other.

7. The structural body according to claim 1, wherein, as compared with a homogeneous laminated body formed by laminating the planar members made of synthetic resin used for the laminated body, the laminated body is lower in both tensile stress and Izod impact strength with respect to at least one tensile direction of a longitudinal direction, a horizontal direction and an oblique direction due to a delaminating action that occurs among layers when an impact is applied to the laminated body, the lowering rates of tensile stress and Izod impact strength being equal to or less than 40%.

8. The structural body according to claim 7, wherein the lowering rates are between 20% and 40%.

9. The structural body according to claim 7, wherein, as compared with the homogeneous laminated body, the laminated body is lower in both tensile stress and Izod impact strength with respect to all tensile directions of a longitudinal direction, a horizontal direction and an oblique direction.

10. The structural body according to claim 1, wherein the planar member made of cloth is a bi-axial woven fabric, a tri-axial woven fabric, a tetra-axial woven fabric or a three-dimensional solid knitted fabric.

11. The structural body according to claim 10, wherein the planar member made of cloth is a bi-axial woven fabric.

12. The structural body according to claim 1, wherein the metal member is formed from ferrous metal material or non-ferrous metal material.

13. The structural body according to claim 1 used as a frame member in a seat structure for a transport machine.

* * * * *